June 15, 1965   C. A. CADY   3,189,788
POWER FAILURE RESPONSIVE CIRCUITS
Filed Jan. 3, 1961
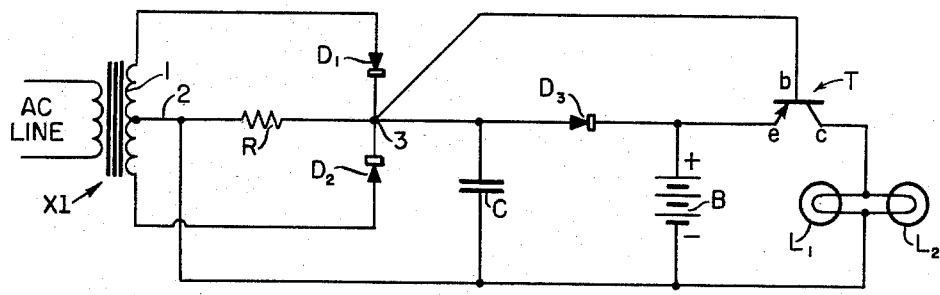
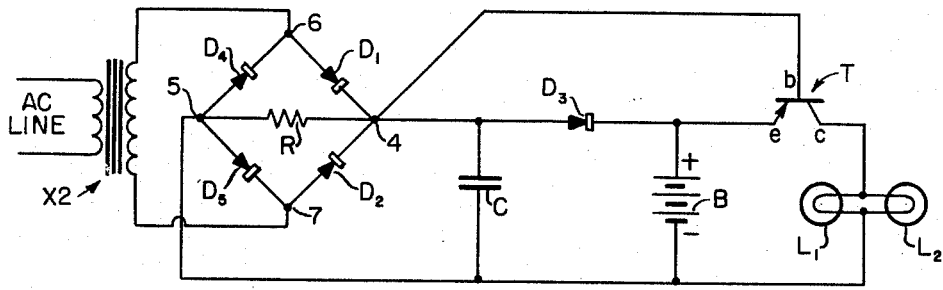
*INVENTOR.*
CHARLES A. CADY
BY *Jenney, Jenney & Hildreth*
ATTORNEYS

United States Patent Office 3,189,788
Patented June 15, 1965

3,189,788
POWER FAILURE RESPONSIVE CIRCUITS
Charles A. Cady, 42 Shaw Drive, Wayland, Mass.
Filed Jan. 3, 1961, Ser. No. 80,138
5 Claims. (Cl. 315—129)

My invention relates to power failure responsive circuits, and particularly to improved circuits for indicating the failure of a power supply or for supplying emergency power in response to the failure of a power supply.

Numerous circuits have been devised for responding to the failure of an electric power supply by supplying power from an auxiliary source or by indicating to an observer that a power failure has occurred. Since such circuits are relied upon to indicate the condition of a main power supply, or to ensure the safety of the system supplied therefrom, it is desirable that they be of a high degree of reliability. In my copending application Serial No. 835,109, filed August 20, 1959, for Emergency Power Supply, I have shown power failure responsive circuits in which the main power supply is employed to charge an auxiliary storage battery, and the main source and the storage battery are interconnected in the control and load circuits of a transistor in such a manner that normally the transistor is cut off by a pair of voltages derived from the main source, but is caused to conduct by the storage battery upon failure of the main power supply and to apply current to a load connected thereto. Such a circuit will perform satisfactorily under normal conditions, but in the event of a failure of the storage battery, or of only one of the voltages from the main source, the unbalanced voltage from the main source may cause damage to the transistor.

In accordance with my present invention, I provide an improved and simplified power failure responsive circuit, in which one bias voltage is derived from the main source to be monitored, and this voltage is applied to the control and indicating components of the circuit in such a manner that it cannot cause false indications or injury to the components even in the event of a failure of the storage battery.

Briefly, my invention comprises one or more lamps for lighting or indicating, or other desired load, connected in the load circuit of an electron control device such as a transistor. A power supply is provided which comprises a storage battery, a diode, and an impedance in series, and means, including a rectifier if necessary, are provided for deriving a unidirectional voltage from the source to be monitored and applying it across the impedance. In this arrangement, the voltage across the impedance will normally charge the storage battery and maintain it at full output capacity. The impedance is connected in the load circuit of the transistor, and the diode connected in the control circuit of the transistor, in such a manner that normally there are no net control or load currents supplied to the transistor, but upon failure of the main source, control and load currents are supplied by the storage battery to energize the load. On the other hand, should the storage battery fail or become disconnected from the circuit, both the load and control circuits of the electron control device will be reversed-biased, so that false operation will be prevented and there will be no possibility of injury to the electron control device due to unbalanced forward-biasing voltages across its terminals.

In accordance with a specific embodiment of my invention, the load comprises one or more lights which are lit upon the failure of an alternating source, and which can supply auxiliary illumination to the area in which they are mounted, or which can serve as indicators of power failure, or both.

Further objects and advantages, and the detailed manner of practicing my invention, will best be understood by reference to the accompanying drawings, and the following description, of illustrative embodiments thereof.

In the drawings,
FIGURE 1 is a schematic wiring diagram of an emergency lighting system in accordance with a first embodiment of my invention; and
FIGURE 2 is a schematic wiring diagram of a modification of the system of FIG. 1.

Referring now to FIG. 1, I have shown a first transformer X1, across the primary winding of which is connected an A.C. line energized by the source to be monitored. The secondary winding 1 of transformer X1 is center tapped, and center tap is connected to one terminal 2 of an impedance, here shown as a resistor R. The opposed terminals of secondary winding 1 are connected through diodes D1 and D2 to the other terminal 3 of resistor R. As shown, diodes D1 and D2 are poled to provide a full wave rectified voltage across resistor R having a magnitude equal to the magnitude of the voltage between the center tap and one extremity of secondary winding 1, such that terminal 3 is positive with respect to terminal 2. If desired, a capacitor C may be connected across resistor R, as shown, to smooth out the voltage across the resistor. However, this capacitor may be omitted, if so desired, without departing from the scope of my invention. Terminal 3 is connected through a diode D3 to the positive terminal of a battery B, the negative terminal of which is connected to terminal 2.

An electron control device, here shown as a transistor T, has a control terminal comprising its base $b$ connected to terminal 3, and a common terminal, serving both as a load and a control terminal, comprising its emitter $e$ connected to the junction of diode D3 and battery B. Thus, the diode D3 is poled in the forward current direction with respect to the emitter-base path of the transistor. As here shown, transistor T is of the pnp type, but it will be apparent to those skilled in the art that a npn transistor could be employed if so desired by a suitable reversal of potentials. The collector $c$ of transistor T, serving as a load terminal is connected through a pair of parallel-connected lamps L1 and L2 to the negative terminal of battery B.

In operation, the A.C. line normally provides a rectified voltage across resistor R which charges battery B through diode D3. Desirably, secondary winding 1 is so designed with respect to the voltage of battery B that the voltage across resistor R is substantially equal to and slightly greater than the voltage of battery B, and while the voltage across resistor R may be even greater, it should never be less than the potential of battery B. Terminal 3 will be at substantially the same potential as the positive terminal of battery B, and the emitter $e$ of transistor T will not be biased with respect to the base B. The collector will be biased negatively with respect to the base by the voltage across resistor R, and negatively with respect to the emitter by battery B. Accordingly, the transistor will be cut off and lamps L1 and L2 will be extinguished.

Should the alternating voltage power supply fail, the emitter will be biased forwardly with respect to the base, and base current will flow through resistor R. The collector will be biased negatively with respect to the base. Due to the forward bias on the emitter circuit, collector current will flow through lamps L1 and L2 in parallel, causing the lamps to be lighted. Depending on the ratings of the transistor and battery, which are selected in accordance with the desired function of the lamps L1 and L2, the lamps may either supply auxiliary lighting for the area, or may simply serve as power-off indicators.

Referring now to FIG. 2, I have shown another modification of my invention in which the same reference characters have been used to resignate parts corresponding to those in FIG. 1. In this circuit, a different rectifier construction is employed to provide a larger voltage from a given transformer secondary winding. In this circuit, the secondary winding of transformer X2 is not center tapped, but has its opposed terminals connected to terminals 6 and 7 of a full wave rectifier comprising diodes D1, D2, D4 and D5 connected in a conventional manner to provide a full-wave rectified output, equal in magnitude to the voltage across the secondary winding of transformer X2, across terminals 4 and 5 of resistor R, such that terminal 4 is positive with respect to terminal 5. The rest of the circuit is similar to that shown in FIG. 1, and the operation of the circuit is the same as that described above, except for the operation of the rectifier, which is well known in the art and is unnecessary to describe in detail.

In the event of the failure of battery B in either of the circuits shown in FIG. 1 and FIG. 2, the transistor will be protected. If battery B is short-circuited, or is operating at reduced potential, the emitter of the transistor will be biased, if at all, slightly negatively with respect to the base by the drop across diode D3. If the battery circuit is open, the emitter will not be biased. The collector will be biased negatively with respect to the base by the voltage across resistor R. It will be apparent to those skilled in the art that under these conditions there will be no resulting damage to the transistor, and that false operation of the lamps will be prevented.

While I have described various detailed embodiments of my invention, many changes and variations will become apparent to those skilled in the art upon reading my description, and such may obviously be made without departing from the scope of my invention.

Having thus described my invention, what I claim is:

1. In combination, an impedance, a diode, and a source of unidirectional voltage connected in series, said diode being poled to oppose the flow of current from said source, means independent of said source for applying a unidirectional voltage across said impedance in a sense opposing said source voltage, and an electron control device having a control terminal, a load terminal, and a common terminal, said diode being connected in series with said control and common terminals and said source being connected in series with said load and common terminals.

2. A power failure indicator, comprising, in combination, an impedance, a diode, and a source of unidirectional voltage connected in series, said diode being poled to oppose the flow of current from said source, a current responsive indicator, a transistor having an emitter, a collector and a base, said diode being connected between said emitter and said base and poled in the forward current direction with respect to the emitter-base path of the transistor, said source being connected between said collector and said emitter in series with said current responsive indicator, and means controlled by a source of power for applying a unidirectional voltage across said impedance to maintain said transistor nonconducting.

3. An emergency lighting system for providing light upon the failure of an alternating power source, comprising, in combination; an impedance having first and second terminals; means controlled by the alternating source for applying a unidirectional bias voltage of a predetermined value across said terminals; a diode having one terminal connected to said first terminal and another terminal connected to one terminal of a source of unidirectional voltage of a value substantially equal to but not more than said predetermined value; said unidirectional source having another terminal connected to said second terminal, said diode being poled to prevent the flow of current from said unidirectional source and said unidirectional source being poled to oppose said bias voltage; a transistor having a collector, an emitter and a base; a lamp; said collector being connected in series with said lamp to said second terminal, said base being connected to said first terminal, said emitter being connected to the junction of said diode and said unidirectional source, and the polarity of said unidirectional source being selected to cause conduction through said collector and said lamp in the absence of said bias voltage; whereby said lamp is lighted upon failure of said alternating source.

4. An emergency lighting system, comprising, in combination, a transistor having a control terminal, a load terminal and a common terminal, a lamp, a storage battery connected in series with said lamp and said load and common terminals, an impedance connected in series with said battery and said common and control terminals, said battery being polled to cause conduction of the transistor, and means controlled by a source of voltage independent of said battery for applying a voltage across said impedance in a sense opposing conduction of the transistor to oppose the flow of current from said battery, whereby said lamp is lighted upon failure of said source.

5. In combination, a transistor having an emitter, a collector, and a base, a storage battery and a load connected in series between said emitter and said collector, a diode connected between said base and said emitter and poled in the forward current direction with respect to the base-emitter path of the transistor, a resistor connected between the junction of the diode and the base and the junction of the battery and the load, said battery being poled to produce a voltage component in said said resistor of a first sense biasing said transistor to conduction and causing current to flow through said load, and means for applying a unidirectional voltage derived from a source across said resistor in a sense opposite said first sense preventing conduction through said load, whereby failure of the source causes current to flow through the load.

References Cited by the Examiner
UNITED STATES PATENTS

| | | | |
|---|---|---|---|
| 2,776,420 | 1/57 | Woll | 340—252 |
| 2,851,638 | 9/58 | Wittenberg et al. | 315—200.1 |
| 2,899,606 | 8/59 | Hicks | 315—200.1 X |
| 2,975,352 | 3/61 | Ford | 320—53 X |
| 3,118,137 | 1/64 | Vincent | 315—129 X |

DAVID J. GALVIN, *Primary Examiner.*

ARTHUR GAUSS, *Examiner.*